United States Patent [19]
Grohoski et al.

[11] Patent Number: 5,077,826
[45] Date of Patent: Dec. 31, 1991

[54] CACHE PERFORMANCE IN AN INFORMATION HANDLING SYSTEM EMPLOYING PAGE SEARCHING

[75] Inventors: Gregory F. Grohoski, Cedar Park, Tex.; John F. Kearns, Rhinebeck, N.Y.; Steven G. Ludwig, Tucson, Ariz.

[73] Assignee: International Business Machines Corporation, Armonk, N.Y.

[21] Appl. No.: 391,763

[22] Filed: Aug. 9, 1989

[51] Int. Cl.[5] .................. G06F 12/06; G06F 12/08
[52] U.S. Cl. ..................... 395/400; 364/DIG. 1; 364/243.41; 364/253; 364/254.3; 364/256.3
[58] Field of Search ... 364/200 MS File, 900 MS File

[56] References Cited

U.S. PATENT DOCUMENTS

| | | | |
|---|---|---|---|
| 4,441,155 | 4/1984 | Fletcher | 364/200 |
| 4,495,575 | 1/1985 | Eguchi | 364/200 |
| 4,612,612 | 9/1986 | Woffinden | 364/200 |
| 4,737,909 | 8/1988 | Harada | 364/200 |
| 4,785,398 | 11/1988 | Joyce et al. | 364/200 |
| 4,797,814 | 1/1989 | Brenza | 364/200 |
| 4,953,073 | 8/1990 | Moussouris et al. | 364/200 |
| 4,985,829 | 1/1991 | Thatte et al. | 364/200 |
| 4,991,081 | 2/1991 | Bosshart | 364/200 |

Primary Examiner—Gareth D. Shaw
Assistant Examiner—John C. Loomis
Attorney, Agent, or Firm—Robert L. Troike

[57] ABSTRACT

A reduction in the number of cycles required to obtain data from main storage when a "miss" occurs in a cache for a desired line of data but a match to another line from the same page of data in main storage as the desired line is present in the cache. In accordance with the present invention if a match to another line from the same page is present, the real address for the other line from the same page is used to fetch the desired line of data directly from the main storage without an address translation. This technique works for a virtually addressed cache whose directory contains both a virtual and a real address for every line of data stored in the cache.

10 Claims, 6 Drawing Sheets

| HIT CLASS 0 | HIT CLASS 1 | HIT CLASS 2 | HIT CLASS 3 | OUTPUT BITS 36 | 37 |
|---|---|---|---|---|---|
| 1 | X | X | X | 0 | 0 |
| 0 | 1 | X | X | 0 | 1 |
| 0 | 0 | 1 | X | 1 | 0 |
| 0 | 0 | 0 | 1 | 1 | 1 |
| 0 | 0 | 0 | 0 | X | X |

WHERE X = DON'T CARE CONDITION

CACHE PERFORMANCE IN AN INFORMATION HANDLING SYSTEM EMPLOYING PAGE SEARCHING

This invention relates to reducing the number of cycles required to obtain data from main storage when a miss occurs in a cache storage in an information handling system.

DESCRIPTION OF THE PRIOR ART

Typically, in a multilevel data storage system, a cache directory is organized into a hardware array consisting of columns and rows. The rows of the directory are referred to as congruency classes and the number of columns in a row are referred to as the associativity of the cache. Each entry in the cache directory contains information about a line of data stored in the cache memory. For a virtually addressed cache the directory may contain the most significant bits of the virtual address, the real page address from which the data came in main storage, protection bits, etc.

When a data request is made of a virtually addressed cache a portion of the virtual address is used to address the cache's directory. The appropriate congruency class is selected in the directory, and a compare is done between the most significant bits of the current address and the corresponding virtual address bits stored in the directory. If a match occurs the data resides in the cache. If no match occurs the data is not in the cache and must be fetched from main storage.

Fetching the data from main storage requires that the virtual address used to address the cache be translated to a real address. The translation process typically involves one or more table lookups before the data can be accessed from main storage.

One of the accepted methods of improving upon the performance of a cache is to use a translation look aside buffer (TLB). Thus, if a miss occurs in the cache, the TLB may contain the translated address of the desired data. This will eliminate the need for an address translation operation and data may be fetched immediately from main storage. However, implementing a TLB usually results in additional hardware costs, and therefore, may not always be possible.

The invention disclosed herein improves upon the performance of the cache without the use of a TLB.

SUMMARY OF THE INVENTION

In accordance with one embodiment of the present invention a computer system using a virtually addressed cache where each entry in the cache's directory contains both the real addresses of the page in main storage from which the data came and the most significant bits of the virtual address. The cache's performance is improved by placing the entries for the lines from the same page of main storage in a predetermined sequence that permits the lines to be searched for by page. Therefore, if the desired line is not found it is possible that another line from the same page already exists in the cache. If this occurs then the real address for the secondary line will be used to construct the address for the primary line, thus eliminating an address translation operation. The desired data can then be fetched directly from the main storage.

DESCRIPTION O THE PREFERRED EMBODIMENT

Figure 1:
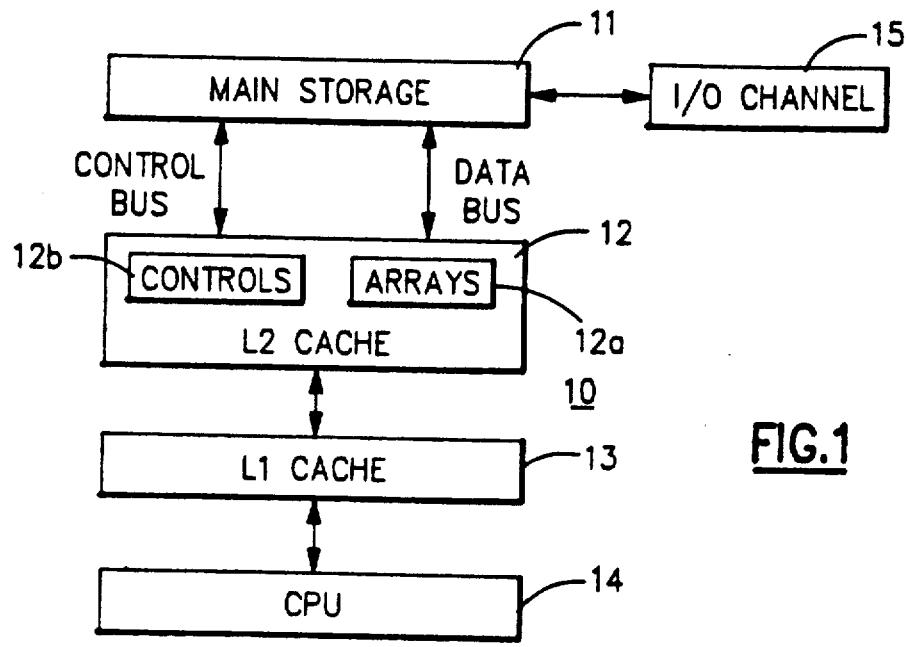
FIG. 1 is a block diagram of a typical computer complex including a second level (L2) cache.

Referring to FIG. 1 there is illustrated a block diagram of a prior art processor system 10 with a two-level cache. The processor CPU 14 is coupled to main storage (MS) 11 via an L1 cache 13 and L2 cache 12. The main storage 11 is also be coupled to an I/O device 15. The L2 cache includes arrays 12a and controls 12b. There is a control bus and a data bus between the main storage (MS) and the L2 cache. When the CPU 14 requires data it makes a request for the data from the virtually addressed L1 cache 13. The L1 cache 13 is searched for the desired data. If the data resides in the L1 cache 13 it is returned to the CPU 14 which resumes its processing. If the data does not reside in the L1 cache 13 the L1 cache 13 will forward the request for the data to the L2 cache 12. The virtually addressed L2 cache 12 is searched for the desired data. If the data is found it is returned to the L1 cache 13 which sends it to the CPU 14. If the data does not reside in the L2 cache 12 it must be fetched from the main storage 11. Fetching the data from main storage 11 requires that the virtual address used to address the L2 12 cache be translated to a real address. The translation process typically involves one or more table look-ups before the data can be accessed from main storage.

Figure 2:
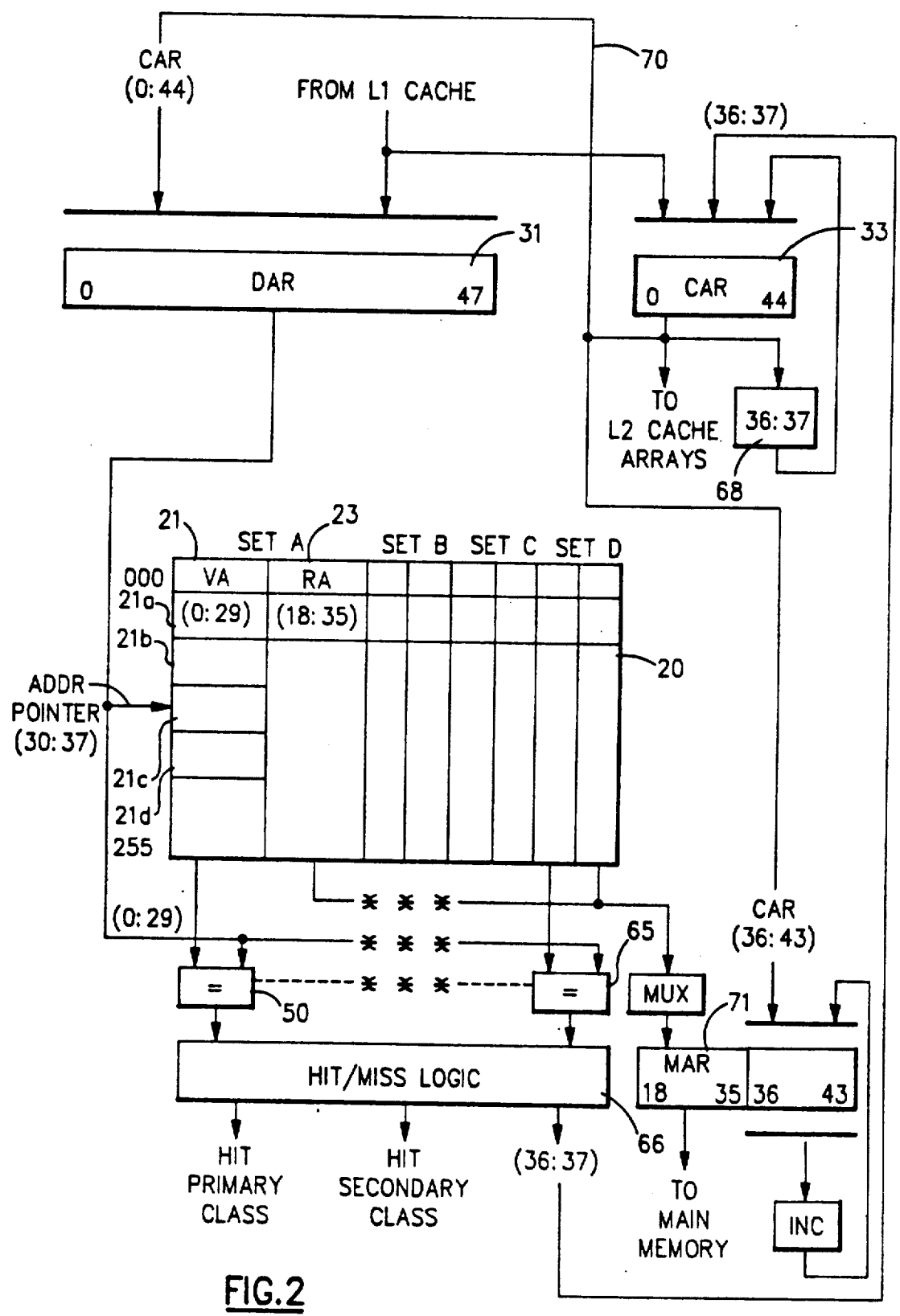
FIG. 2 shows the invention employed in a second level (L2) cache directory for a system like in FIG. 1.

FIG. 2 shows the implementation of the invention on a 1 megabyte (1 MB) second level cache L2 12 that services a first level L1 cache 13 that interfaces to a processor 14 (CPU). The L2 cache 12 has a line size of 1 kilobyte (1 KB) and corresponding to each 1K block of data in the cache is a directory 20 entry containing among other things the most significant bits of the virtual address 21 (0:29) and the real 4 KB page addresses 23 (18:35) from which the data came from in main storage.

Figure 3:
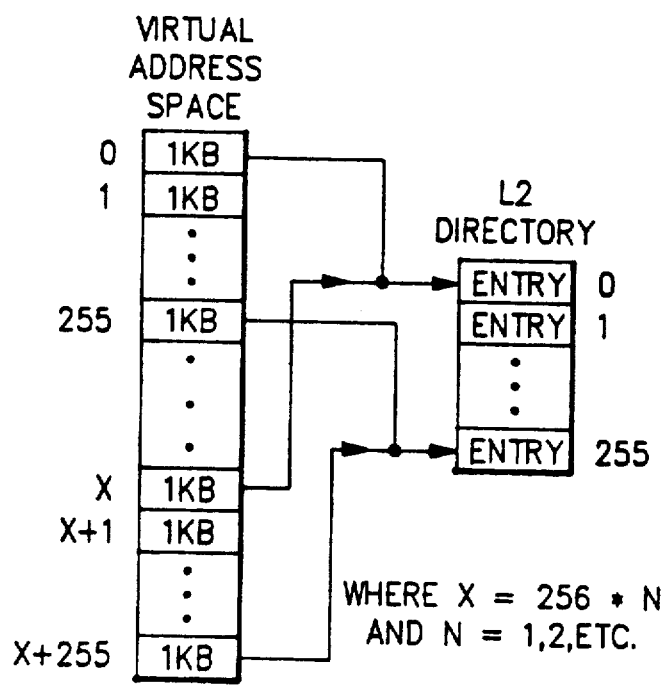
FIG. 3 shows how the virtual address bits used to address the L2 cache are mapped into the L2 cache directory.

The 1024 entries in directory 20 are organized in an array of 256 addresses or congruency classes by four sets (A, B, C, and D). Since the directory is addressed with bits 30 through 37 of the virtual address it is easy to determine which virtual addresses are placed or mapped into a particular row or congruency class of the directory. The virtual address of the first 1 KB block of the virtual address space is mapped into the first row or congruency class (class 0 or address 0). The virtual address of the second 1 KB block of the virtual address space is mapped into the second congruency class. And so on until 1 KB block number 255 of the virtual address space is mapped into congruency class 255. The mapping then wraps around with block 256 being mapped into congruency class 0. See FIG. 3.

When an address maps to a particular congruency class that virtual address can be placed in one of four places; Set A, Set B, Set C, or Set D. This is due to the fact that this cache is four way set associative. When one or more sets in a particular congruency class are empty or not valid the sets are filled in a predetermined order until they are all used. When all sets are full or used the least recently used set is cast out (data returned to main storage) and the virtual address placed in that set.

The normal sequence of events that occur when the L1 cache 13 makes a request of the L2 cache 12 is for the L2 cache 12 to search its directory 20 for the entry. The L2 cache directory 20 is searched by first addressing it with bit numbers 30 through 37 of the 48 bit virtual address. The four sets for the addressed class are read and a comparison is done on a 30 bit virtual address stored for each set in the class along with the appropriate protection bits. If a match exists then the desired data resides in the cache and a "hit" is signalled from the hit/miss logic 66. If a match cannot be made then a "miss" is signalled and the L2 cache 12 proceeds to request the data from the main storage 11.

The L2 cache's 12 request for data from the main storage 11 requires that the virtual address used to address the L2 cache 12 be converted to a real address through an address translation algorithm. This algorithm first generates a request to main storage for a hash table entry followed by a request for a page table entry. The number of page frame table requests depends upon whether chaining of page table entries has occurred. Finally, a request is made to main storage 11 for the desired 1K line of data if the data exists in the main storage 11.

In accordance with the present invention a primary/secondary L2 cache directory searching method and apparatus would eliminate the request to main storage 11 for a hash table entry and page frame table entries when another 1K line from the same 4K page exists in the L2 cache 12. Each entry in the L2 cache 12 contains the real address of the 4K page from which it came from in the main storage 11. Therefore, if another line from the same page as the desired line could be located in the L2 cache 12 it would not be necessary to access the main storage 11 for the hash table and page frame table entries. This can be accomplished by placing entries for lines from the same 4K page of real storage in a specific relationship with respect to one another in the L2 cache directory 20.

This relationship is provided, for example, by placing the 1K lines from the same 4K page in the sequential rows or congruency classes to be searched The first 1K line of a given page is mapped into the first row 21a, the second 1 KB line of the page 0 is in second row 21b, the third line of the page 0 is in the third row 21c, and the fourth line of the page 0 is in row 21d.

Figure 4:
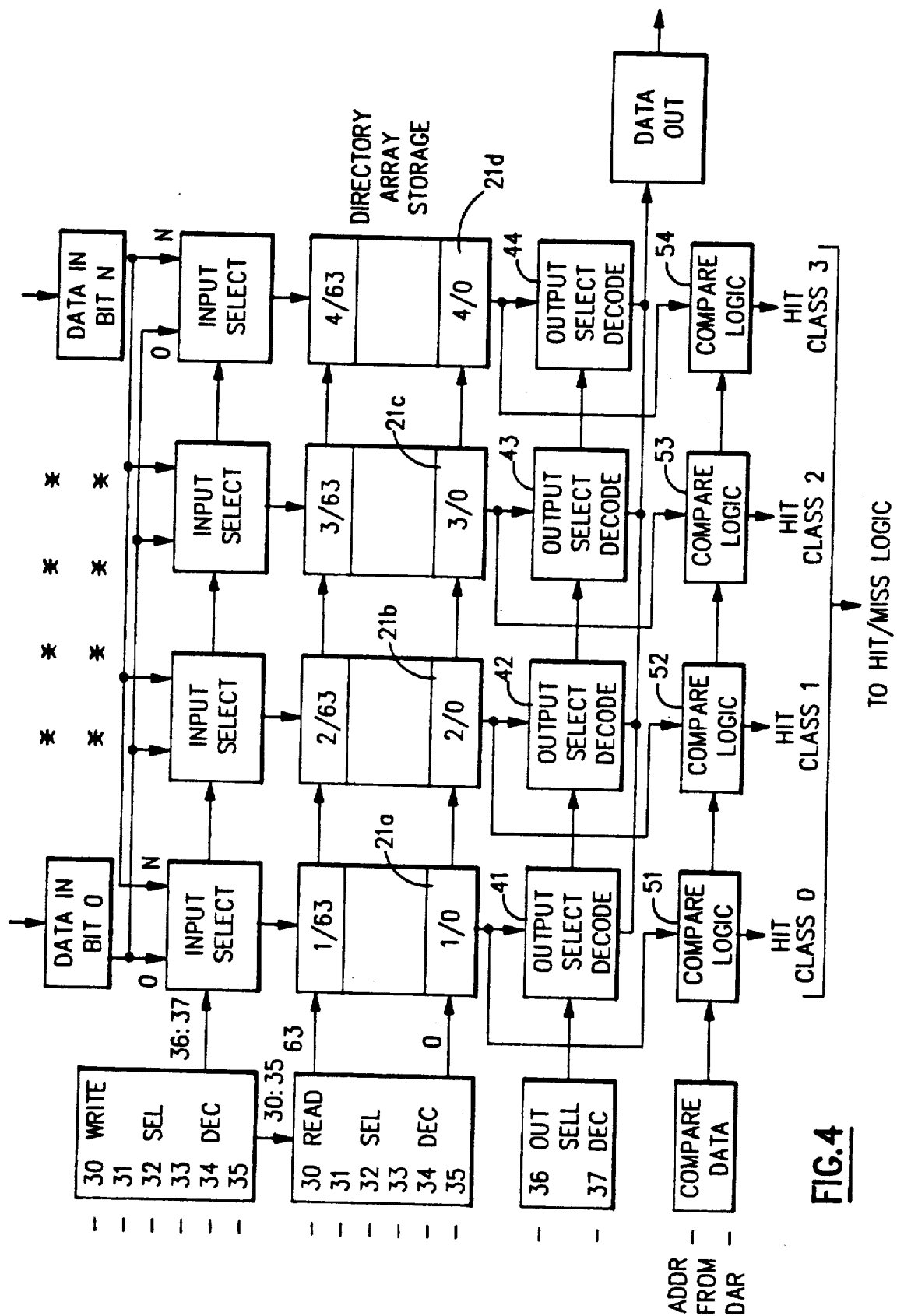
FIG. 4 illustrates how 1K byte lines from the same 4K byte page could be organized in a cache directory.

FIG. 4 illustrates in more detail for a specific type of directory how the 1K byte lines from the same 4K page are placed in set A of the directory. The bits 30-35 define a 4K byte page. There are 64 pages (0-63) in each set. The four 1K byte lines of a given page are simultaneously provided to output decode logic 41-44 and comparators 51-54. For example with bit numbers 30-35 all zeros the lines 1/0, 2/0, 3/0 and 4/0 of page 0 are provided to the output decode 41-44 and comparators 51-54. This placement of data in the directory is the same for the remaining sets (B, C and D) of the directory. From FIG. 4 it can be seen that when the L2 directory is searched for a desired 1K byte line all congruency classes where other 1K byte lines from the same 4K byte page of data may reside in the directory are simultaneously searched. It should be noted that these other congruency classes being searched may contain data from other 4K byte pages. However, if another line from the same 4K byte page does exist in the cache then, information about that line must exist in one of the directory locations being searched and nowhere else in the directory. Bit numbers 36 and 37 of the virtual address determine the primary line address being searched. The remaining three congruency classes represents the locations where possibly other lines (secondary lines) from the same 4K page are located.

Figure 6:
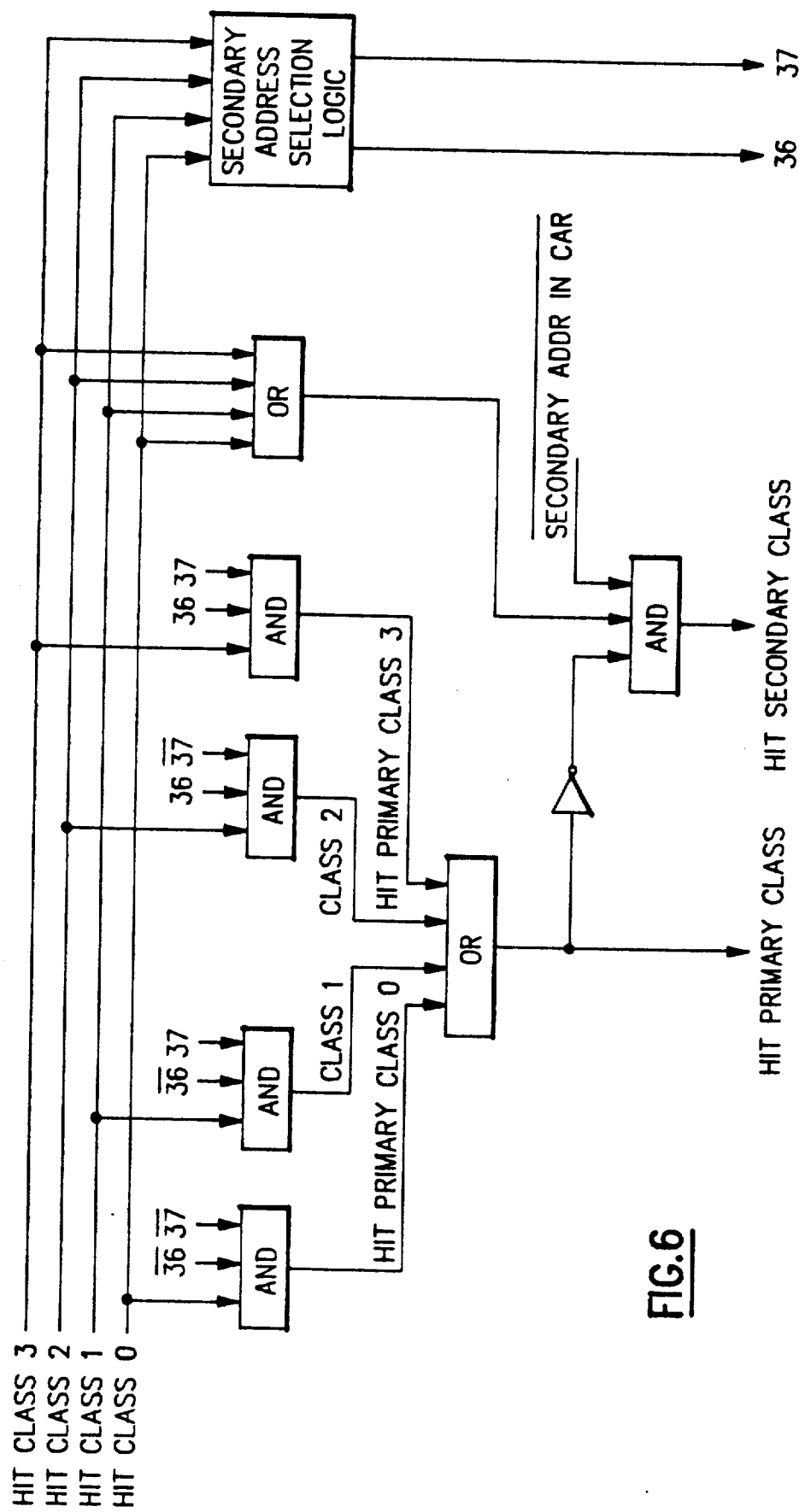
FIG. 6 is a logic diagram of the hit/miss logic of FIG. 2.

The virtual address bits stored in the cache will be compared against the virtual address bits (0:29) stored in the Directory Address Register (DAR) at comparators 51-54. If these two sets of bits are equal the compare out line(s) will be activated indicating the desired 1K byte line of data exists in the cache and/or another 1K line from the same 4K page of data is resident in the cache. This information will be sent to the hit/miss logic 66 shown in FIG. 2. If a "hit" occurs as to the primary class the "Hit Primary Class" line will be activated. A detailed description of the logic required to drive the "Hit Primary Class" line is shown in FIG. 6. From FIG. 6 it can be seen that if the Hit Class 0, 1, 2 or 3 lines are activated and the corresponding address bits (36 and 37) are activated the "Hit Primary Class" line will be activated.

If a "miss" occurs as to the primary class but there is a "hit" as to the page at comparators 51-54 (secondary class bit), the "Hit Secondary Class" line will be activated in FIG. 2. The detailed logic required to activate the "Hit Secondary Class" line is shown in FIG. 6. The real address for the secondary line will be used to construct the address for the primary 1K line thus eliminating two or more accesses to the main storage 11 for a hash table and page frame table entries. The only access to main storage will be for the 1K line of desired data.

Figure 5:
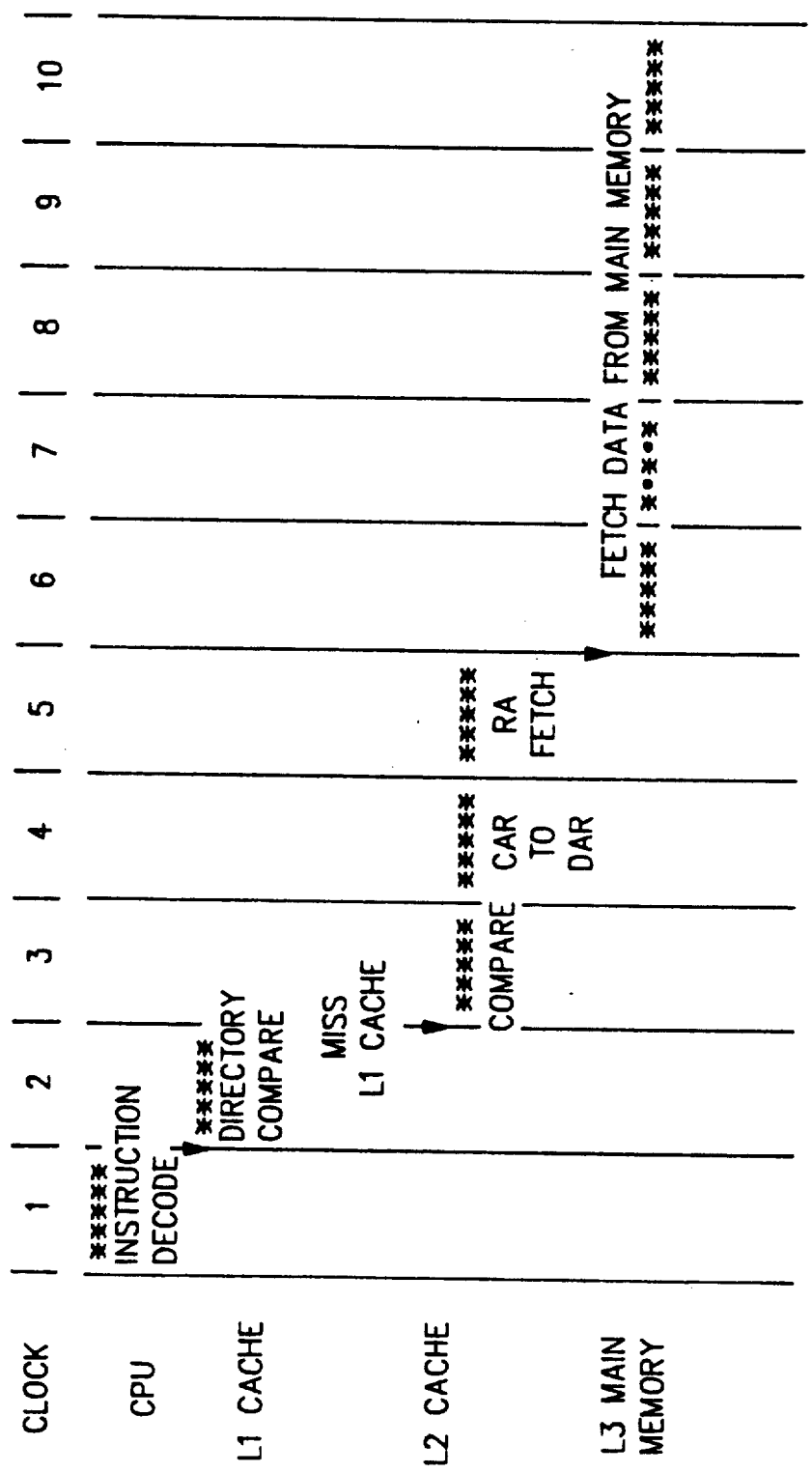
FIG. 5 shows a timing diagram illustrating the Primary/Secondary Search Technique for a Fetch Operation.

The following is a detailed example of a Fetch Operation applying this invention. The hardware description for the example references FIG. 2 and the timing relationships can be seen in FIG. 5.

The Direct Address Register (DAR) 31 and the Cache Address Register 33 (CAR) are loaded with the primary virtual address from the requesting lower level L1 cache. The virtual address bits (0:29) stored in the directory 20 for the four sets of the primary class and the 12 sets of the secondary class are compared at comparators 50-65 with the virtual address bits (0:29) in the DAR 31.

Figures 7, 8:
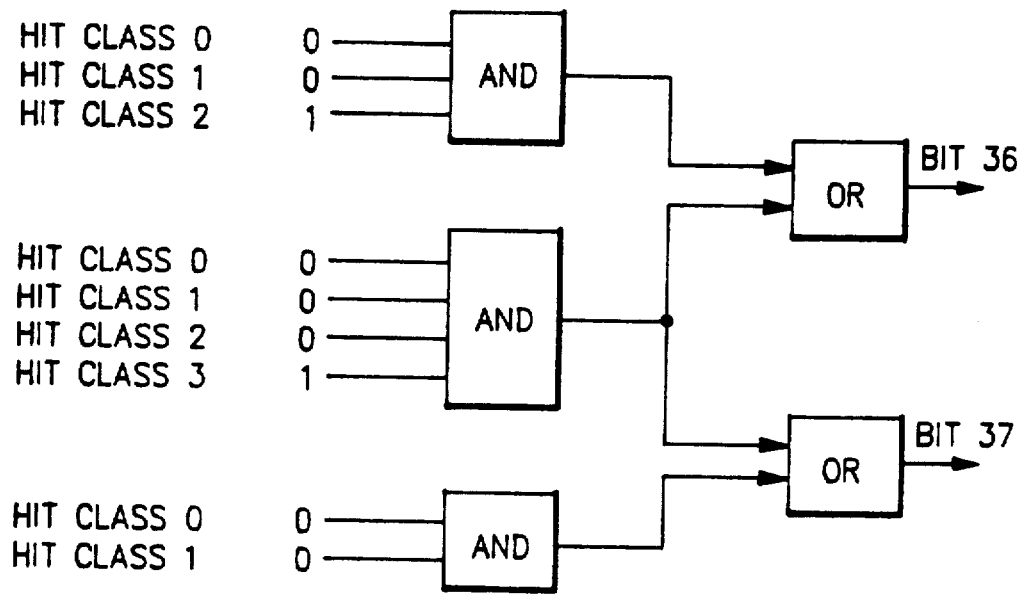
FIG. 7 is a logic diagram of the secondary address selection logic of FIG. 6.
FIG. 8 is a truth table of the secondary address selection logic.

If at the end of the L2 directory compare cycle (time period 3 in FIG. 5) it has been determined that a "miss" (no match) has occurred in the primary class and a "hit" (or match) has occurred in the secondary class, the primary address in the CAR register 33 will then be updated to the secondary class address (i.e., bit numbers 36 and 37 updated in primary address). Bits 36 and 37 for the secondary class address are determined as shown in FIGS. 7 and 8. The two bits 36 and 37 from the primary class will be saved in a two bit latch 68 for reuse. At time period 4 control bits associated with the CAR register 33 will cause its secondary class address to be loaded via leads 70 into the DAR 31 when the CAR 33 is granted priority. The two primary bits 36 and 37 saved in the above two bit latch will be reloaded into the CAR register 33. The CAR register 33 will now contain the virtual address of the primary class which will be used to load the data from Main Storage 11 into the L2 cache 12.

The secondary class address in the DAR 31 will be used to address the directory 20. The Hit Primary Class and Hit Secondary Class lines will be inhibited. At time period 5 the appropriate real address (RA) bits (bits 18-35) from the directory will be placed in a Memory Address Register (MAR) 71. Bits (36-43) will be loaded from the CAR 33 into the MAR 71. When the first quad word of data arrives at the L2 cache 12 array 12a chips the CAR containing the primary page address will be incremented 63 times. This will result in a 1K byte line of data being read into the L2 cache array 12a.

This invention can be used in other cache configurations (associativity, line size, virtual address size). The invention can be used with any page size of main storage. The search for primary and secondary line can be done sequentially rather than simultaneously. It is preferred to be simultaneous for improved cache performance.

What is claimed is:

1. In a computer system using a virtually addressed cache where each entry in the cache's directory contains both a real address of the page in a main storage from which the data came and the most significant bits of a virtual address, the method for extending the cache's performance comprising the steps of:
   a. placing the entries for lines from the same page of main storage in a predetermined sequence in the directory of the cache that permits all of the lines within a page boundary to be searched for by a page address;
   b. searching the directory for both the desired line and the secondary lines from the same page; and
   c. if the desired line does not reside in the cache but a match occurs as to one or more lines from the same page, concatenating the real page address in the directory for the secondary line with that portion of the virtual address identifying the desired line to fetch the data directly from the main storage without an address translation.

2. The method of claim 1 wherein said lines for the same page are placed in sequential rows of the directory.

3. In a computer system using a virtually addressed cache where each entry in the cache's directory contains both a real address of the page in a main storage from which the data came and the most significant bits of a virtual address, the method for extending the cache's performance comprising the steps of:
   a. placing the entries for lines from the same page of main storage in a sequence in a directory of the cache that permits the lines to be searched simultaneously;
   b. searching the directory for both the desired line and the secondary lines from the same page, and
   c. if the desired line does not reside in the cache but a match occurs as to the lines from the same page, concatenating the real address in the directory for the secondary line with that portion of the virtual address identifying the desired line to fetch the data directly from the main storage without an address translation.

4. The method of claim 3 including the step of providing the lowest numbered secondary line if there is more than one secondary line from the same page.

5. In a computer system having a processor, a main storage, virtually addressed cache including a directory containing both the most significant bits of a virtual address and a real page address from which the data came from in main storage, and a means for translating virtual addresses to real addresses and means for directly fetching the desired data from main storage, the improvement for permitting the desired data to be directly fetched from the main storage without an address translation in the event of a cache miss comprising:
   a. said cache directory having entries for lines from the same page of memory in a predetermined sequence that permits all of the lines within a page boundary to be searched by a page address;
   b. means for searching the cache directory for both the desired line and secondary lines from the same page;
   c. means for detecting when a match occurs for the desired line using the cache directory data;
   d. means for detecting when a match occurs for a secondary line using the cache directory data; and
   e. means for fetching the desired data directly from the main storage without an address translation by concatenating the real page address of the secondary line from the directory with that portion of the virtual address from the directory that defines the desired line.

6. In a computer system having a processor, a main storage, virtually addressed cache including a directory containing both the most significant bits of a virtual address and a real page address from which the data came from in main storage, and a means for translating virtual addresses to real addresses and for fetching the desired data from main storage, the improvement for permitting the desired data identified by incoming virtual address bits to be directly fetched from the main storage without an address translation in the event of a cache miss comprising:
   a. said cache directory having entries for lines from the same page of memory in an order such that they are searched simultaneously;
   b. means for searching the cache directory for both the desired line and secondary lines from the same page;
   c. means for detecting when a match occurs for the desired line using the cache directory data;
   d. means for detecting when a match occurs for a secondary line using cache directory data, and
   e. means for fetching the desired data directly from the main storage without an address translation by concatenating the real page address of the secondary line from the directory with that portion of the virtual address from the directory that defines the desired line.

7. The combination of claim 6 wherein said order is such that the lines from the same page are in sequential rows.

8. The combination of of claim 7 wherein said cache includes a comparator means for comparing the incoming virtual address bits with the virtual address bits in the directory and if there is a match to a secondary line the real page address from the same page in memory is concatenated with that portion of the virtual address bits identifying the desired line to address the main storage.

9. The combination of claim 8 wherein said cache includes a DAR, a CAR, a MAR, and logic means wherein said incoming bits are stored in the DAR and compared with those in the directory at said comparator means and if there is a match as to the secondary line in the DAR, the CAR and the MAR address bits are changed to this secondary line address.

10. The combination of claim 6 including means when there is more than one secondary line from the same page for providing the lowest numbered line.

* * * * *